United States Patent
Su et al.

(10) Patent No.: US 11,057,064 B1
(45) Date of Patent: Jul. 6, 2021

(54) RFI ESTIMATION DEVICE, SIGNAL PROCESSING DEVICE AND SIGNAL PROCESSING METHOD

(71) Applicant: Realtek Semiconductor Corp., HsinChu (TW)

(72) Inventors: Chi-Hsi Su, HsinChu (TW); Liang-Wei Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/022,119

(22) Filed: Sep. 16, 2020

(30) Foreign Application Priority Data

Jan. 17, 2020 (TW) .................................. 109101615

(51) Int. Cl.
*H04B 1/10* (2006.01)
*H04B 1/16* (2006.01)

(52) U.S. Cl.
CPC ................. *H04B 1/10* (2013.01); *H04B 1/16* (2013.01)

(58) Field of Classification Search
CPC ........ H04B 1/10; H04B 1/1036; H04B 1/719; H04B 1/1027; H04B 1/123; H04B 17/345; H04L 27/2647
See application file for complete search history.

(56) References Cited

U.S. PATENT DOCUMENTS

| | | | |
|---|---|---|---|
| 5,410,750 A * | 4/1995 | Cantwell | G01S 19/21 375/148 |
| 8,498,217 B2 | 7/2013 | Kota | |
| 10,791,006 B1* | 9/2020 | Lin | H04L 25/03019 |
| 2004/0028011 A1* | 2/2004 | Gehring | H04L 27/28 370/330 |
| 2006/0045170 A1* | 3/2006 | van Rensburg | H04B 1/7107 375/148 |
| 2009/0086863 A1* | 4/2009 | Komninakis | H04B 1/10 375/346 |
| 2010/0159866 A1* | 6/2010 | Fudge | H04B 1/1036 455/302 |

(Continued)

OTHER PUBLICATIONS

Kyehun Lee, Coherent Mitigation of Radio Frequency Interference in 10-100 MHz, Doctor of Philosophy, Dissertation, Virginia Polytechnic Institute and State University, Aug. 28, 2008 (Year: 2008).*

(Continued)

*Primary Examiner* — Aristocrats Fotakis
(74) *Attorney, Agent, or Firm* — Winston Hsu (57) ABSTRACT

A Radio Frequency Interference (RFI) estimation device for generating an estimated RFI signal includes a combiner, a first multiplier and a second multiplier. The combiner is configured to combine a first digital signal and a second signal to generate the estimated RFI signal. The first multiplier is configured to generate the first digital signal according to an in-phase signal and a first cosine signal. The second multiplier is configured to generate the second digital signal according to a quadrature-phase signal and a first sine signal. The first cosine signal and the first sine signal are generated based on a frequency and the in-phase signal and the quadrature-phase signal are generated based on the frequency and one or more harmonics of the frequency.

19 Claims, 5 Drawing Sheets

(56) References Cited

U.S. PATENT DOCUMENTS

| | | | |
|---|---|---|---|
| 2012/0014416 A1* | 1/2012 | Dabiri | H03H 21/0021 375/144 |
| 2012/0014487 A1* | 1/2012 | Dabiri | H03H 21/0021 375/350 |
| 2012/0128048 A1* | 5/2012 | Dabiri | H04B 3/46 375/224 |
| 2013/0072143 A1* | 3/2013 | Dabiri | H03H 21/0021 455/307 |

OTHER PUBLICATIONS

Timothy Miller, Lee Potter, John McCorkle, RFI Suppression for Ultra Wideband Radar, The Ohio State University, Army Research Laboratory, Oct. 1997 (Year: 1997).*

Tien M. Nguyen, et al, Radio Interference Modeling and Prediction for Satellite Operation Applications, The Catholic University of America, Air Force Research Laboratory, Aug. 25, 2015 (Year: 2015).*

\* cited by examiner

RFI ESTIMATION DEVICE, SIGNAL PROCESSING DEVICE AND SIGNAL PROCESSING METHOD

BACKGROUND OF THE INVENTION

1. Field of the Invention

The invention relates to a signal processing device in a communication device, more particular to a signal processing device capable of effectively eliminating radio frequency (RF) interference.

2. Description of the Prior Art

In almost any communication system, interference, externally or internally generated, causes errors in the transmission signals and limits the performance of the communication system. For example, noise in the transmission channel or errors in the components of the communication device may cause the voltage level of the transmission signal to deviate from the ideal voltage level (that is, the voltage level set by the transmitter). When the voltage deviation is too large, it will cause misjudgment at the receiver side and the communication performance degrades.

In view of this, the communication devices are usually equipped with circuits or devices for eliminating unwanted interference. The interference eliminating circuit or device usually adaptively trains or adjusts the interference related parameters, such that the performance of interference elimination can be optimized. However, when the voltage deviation is too large, it will also cause errors in parameter adjustment, resulting in that the signal error cannot converge during the procedure of adaptive training or the adaptive adjustment. For example, suppose that the voltage level of the symbols utilized in a communication system comprises four levels {+3, +1, −1, −3}. When the interference is too large that causes the voltage level of a symbol to shift from +1 to +2.6, the receiver will determine that its ideal voltage level is +3 and the amount of error is −0.4, and the receiver will use the amount of error that it determined to adjust the related parameters. However, the actual amount of error of this symbol is +1.6. Therefore, the amount and the direction of the error determined by the receiver are both wrong. If the receiver keeps using the wrong determinations to adjust the parameters of the interference eliminating circuit or device, the direction and the amount of parameter adjustment will all be wrong, making the signal error at the receiver cannot converge, which may eventually lead to serious consequences such as disconnection between the receiver and the transmitter.

SUMMARY OF THE INVENTION

An objective of the invention is to provide a signal processing method and associated signal processing device and a radio frequency interference (RFI) estimation device, so as to solve the problem that the receiver's signal error cannot converge. In the proposed signal processing method and associated signal processing device and the RFI estimation device, the RFI components can be effectively eliminated at the receiver side by simulating the RFI signal according to the main frequency of the RFI signal and its harmonics. In this manner, the signal error at the receiver side can effectively converge. In addition, the proposed signal processing method and associated signal processing device and the RFI estimation device are also helpful for the parameters utilized by the interference eliminating circuit or device to be smoothly adjusted to the optimized values that can minimize the symbol error during the adaptive adjusting or training procedure.

According to an embodiment of the invention, a Radio Frequency Interference (RFI) estimation device for generating an estimated RFI signal comprises a combiner, a first multiplier and a second multiplier. The combiner is configured to combine a first digital signal and a second signal to generate the estimated RFI signal. The first multiplier is configured to generate the first digital signal according to an in-phase signal and a first cosine signal. The second multiplier is configured to generate the second digital signal according to a quadrature-phase signal and a first sine signal. The first cosine signal and the first sine signal are generated based on a frequency and the in-phase signal and the quadrature-phase signal are generated based on the frequency and one or more harmonics of the frequency.

According to another embodiment of the invention, a signal processing device applicable for a communication device and configured to process a received signal comprises a Radio Frequency Interference (RFI) eliminator circuit. The RFI eliminator circuit comprises a RFI estimation device and a first combiner. The RFI estimation device is configured to generate an estimated RFI signal. The first combiner is configured to combine the estimated RFI signal and the received signal to generate a processed signal. The RFI estimation device comprises a second combiner, a first multiplier and a second multiplier. The second combiner is configured to combine a first digital signal and a second signal to generate the estimated RFI signal. The first multiplier is configured to generate the first digital signal according to an in-phase signal and a first cosine signal. The second multiplier is configured to generate the second digital signal according to a quadrature-phase signal and a first sine signal. The first cosine signal and the first sine signal are generated based on a frequency and the in-phase signal and the quadrature-phase signal are generated based on the frequency and one or more harmonics of the frequency.

According to yet another embodiment of the invention, a signal processing method for processing a received signal, suitable for a communication device, comprises: estimating a Radio Frequency Interference (RFI) signal to generate an estimated RFI signal; and subtracting the estimated RFI signal from the received signal to generate a processed signal. The step of estimating the RFI signal to generate the estimated RFI signal further comprises: generating a first sine signal and a first cosine signal according to a frequency; generating an in-phase signal according to the frequency and one or more harmonics of the frequency; generating a quadrature-phase signal according to the frequency and the one or more harmonics of the frequency; generating a first digital signal according to a product of the in-phase signal and the first cosine signal; generating a second digital signal according to a product of the quadrature-phase signal and the first sine signal; and combining the first digital signal and the second digital signal to generate the estimated RFI signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
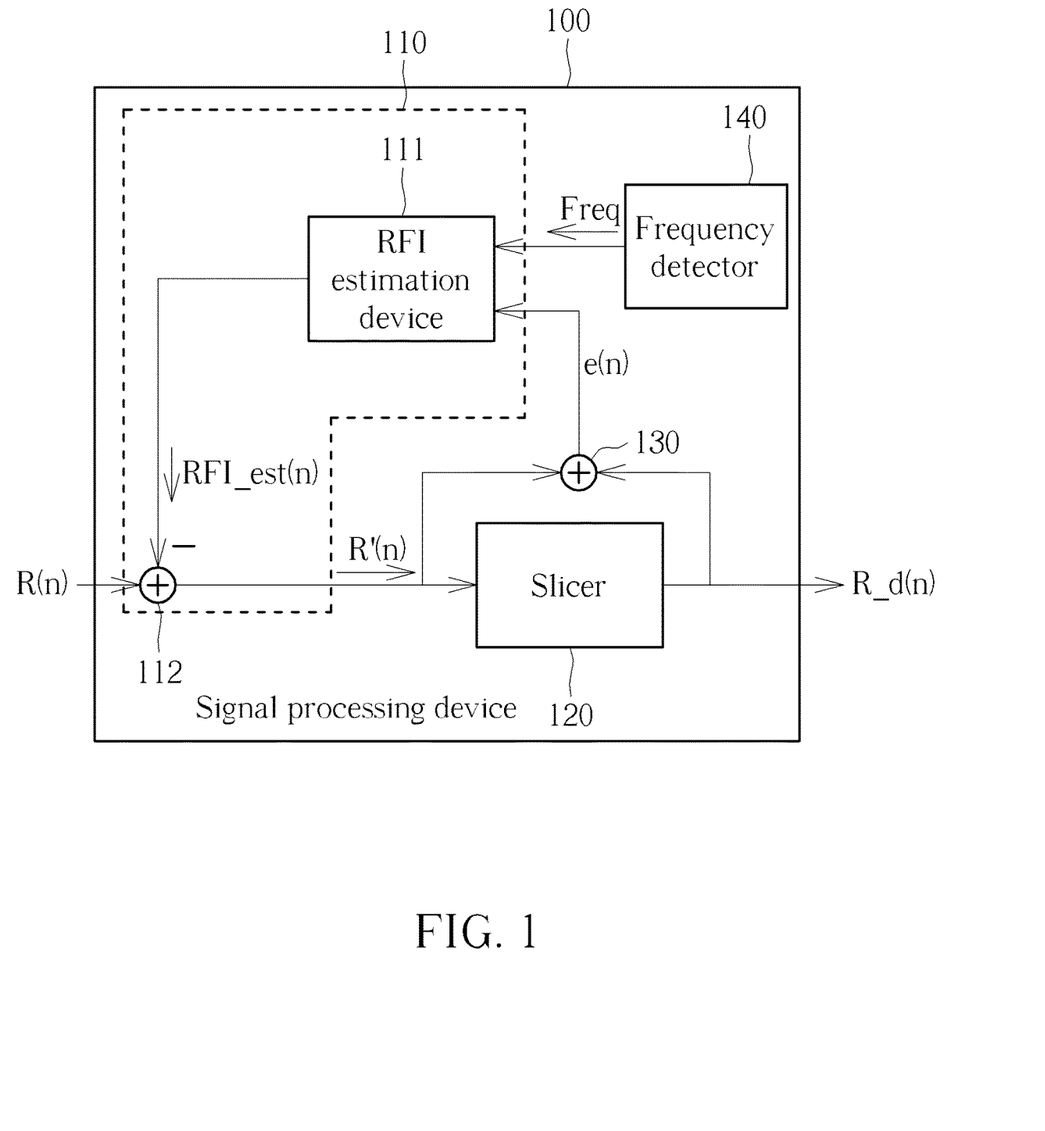
FIG. 1 is an exemplary block diagram of a signal processing device according to an embodiment of the invention.

FIG. 1 is an exemplary block diagram of a signal processing device according to an embodiment of the invention. The signal processing device 100 is applicable for a communication device, such as a receiver in a communication system, and is configured to process a received signal R(n). The signal processing device 100 may at least comprise a RFI eliminator circuit 110, a slicer 120 and a combiner 130.

It should be noted that, in order to clarify the concept of the invention, FIG. 1 presents a simplified block diagram in which only the components relevant to the invention are shown. As will be readily appreciated by a person of ordinary skill in the art, a signal processing device, a receiver or a communication device may further comprise other signal processing related components configured for processing the received signal. As an example, the signal processing device, the receiver or the communication device may comprise one or more equalizers or filtering circuits for compensating for the channel effect in the communication system.

The RFI eliminator circuit 110 may comprise at least a RFI estimation device 111 and a combiner 112. The RFI estimation device 111 is configured to generate an estimated RFI signal RFI_est(n). The combiners 112 and 130 are configured to perform operations of signal combination, including addition and/or subtraction of the signals. As an example, the combiner 112 is configured to combine the estimated RFI signal RFI_est(n) and the received signal R(n) (for example, subtracting the estimated RFI signal RFI_est (n) from the received signal R(n)) to generate a processed signal R'(n). The received signal R(n) and the processed signal R'(n) correspond to a symbol transmitted by the transmitter at the sampling time n. The slicer 120 is configured to determine a value (that is, a determined value R_d(n)) of the symbol transmitted by the transmitter according to a voltage value of the processed signal R'(n). The combiner 130 is configured to combine the voltage value of the processed signal R'(n) and the determined value R_d(n) to generate an error signal e(n) (for example, the difference value obtained by subtracting the processed signal R'(n) from the determined value R_d(n)). A feedback path may be provided for feeding the error signal e(n) back to the RFI estimation device 111.

According to an embodiment of the invention, the RFI estimation device 111 may generate an estimated RFI signal RFI_est(n) by combining the digital signal D1($n$) and the digital D2($n$). The RFI estimation device 111 may receive information regarding a frequency Freq from a frequency detector 140 and generate the digital signal D1($n$) and the digital D2($n$) according to the frequency Freq and the error signal e(n). The frequency detector 140 is configured to estimate a frequency related to the RF interference, for example, a main frequency of the RF interference, and the frequency Freq is an estimated value of the main frequency of the RF interference.

Figure 2:
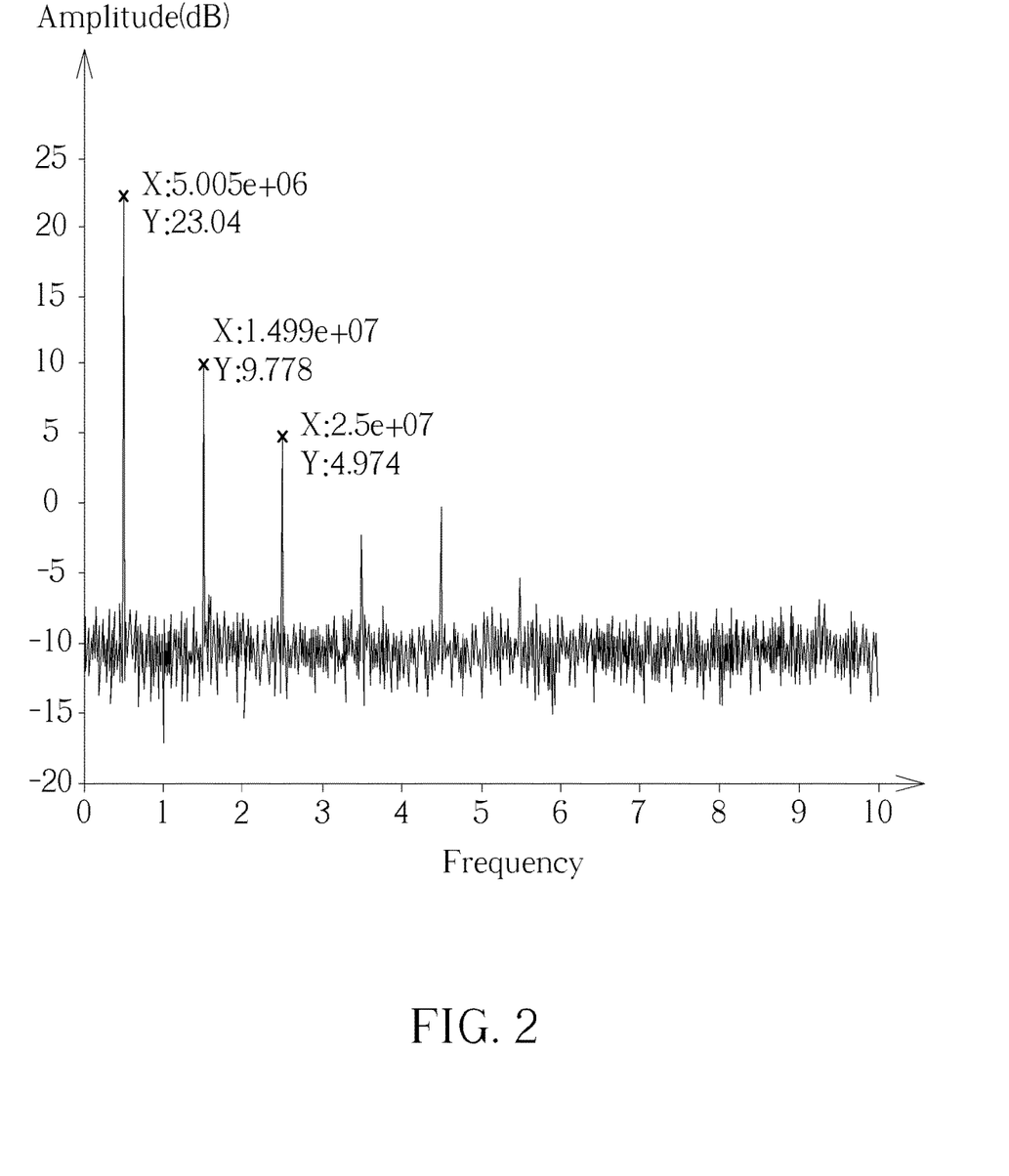
FIG. 2 is an exemplary power spectrum of the error signal e(n) according to an embodiment of the invention.

FIG. 2 is an exemplary power spectrum of the error signal e(n) according to an embodiment of the invention, where the x-axis represents the frequency and the y-axis represents the amplitude. In this example, it is supposed that the main frequency of the RF interference is 5 MHz and the situation that the amount and the direction of error estimated by the receiver are both wrong because the voltage deviation is too large is also shown in this example. As can be seen from FIG. 2, besides the main frequency component, the frequency components of the error signal e(n) further comprise one or more harmonics of the main frequency, such as the energy located at the 15 MHz, 25 MHz, etc. Therefore, to solve the problem that the signal error at the receiver side cannot effectively converge, the RFI eliminator circuit 110 is configured to eliminate both the main frequency component and the harmonic components of the RF interference, so as to effectively minimize the error signal e(n) by using the feedback mechanism of the error signal e(n).

Figure 3:
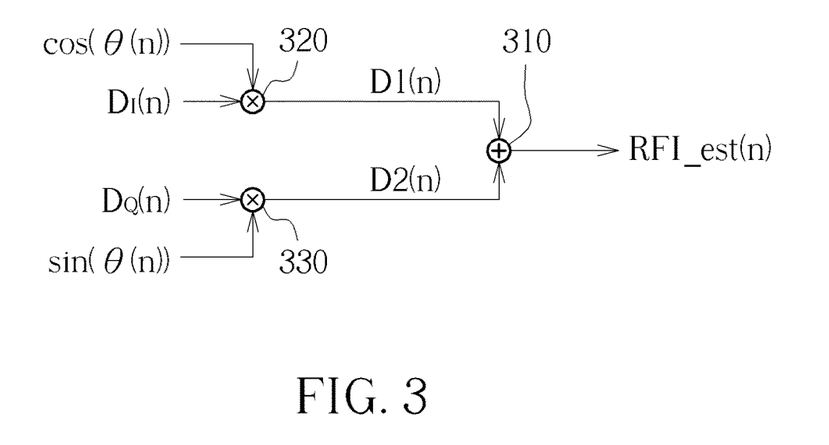
FIG. 3 is an exemplary block diagram of a portion of the RFI estimation device according to an embodiment of the invention.

FIG. 3 is an exemplary block diagram of a portion of the RFI estimation device according to an embodiment of the invention. The RFI estimation device may comprise a combiner 310 and multipliers 320 and 330. The combiner 310 is configured to perform operations of signal combination, including addition and/or subtraction of the signals. For example, the combiner 130 is configured to combine the digital signals D1($n$) and D2($n$) to generate the estimated RFI signal RFI_est(n). The multiplier 320 is configured to generate the digital signal D1($n$) according to the in-phase signal $D_I$(n) and the cosine signal cos(θ(n)). The multiplier 330 is configured to generate the digital signal D2($n$) according to the quadrature-phase signal $D_Q$(n) and the sine signal sin(θ(n)). For example, the multipliers 320 and 330 may respectively multiply the in-phase signal $D_I$(n) and the cosine signal cos(θ(n)) together and multiply the quadrature-phase signal $D_Q$(n) and the sine signal sin(θ(n)) together to generate the digital signal D1($n$) and the digital signal D2($n$).

Operations of the RFI estimation device may be illustrated in brief through the following equations (1) and (2):

$$\text{RFI\_est}(n) = D1(n) + D2(n) \qquad \text{Eq. (1)}$$

$$= D_I(n) * \cos(\theta(n)) + D_Q(n) * \sin(\theta(n)) \qquad \text{Eq. (2)}$$

According to an embodiment of the invention, the sine signal sin(θ(n)) and the cosine signal cos(θ(n)) are generated based on the frequency Freq. The following equation (3) shows the relationship between the angle θ(n) and the frequency Freq of the signal:

$$\theta(n) = 2\pi * \text{Freq} * (nT_s) \qquad \text{Eq. (3)}$$

where Ts is the sampling period for sampling a symbol and n is the time index of the sampling time n.

According to an embodiment of the invention, in order to eliminate the RF interference together with its harmonics, the in-phase signal $D_I$(n) and the quadrature-phase signal $D_Q$(n) may be generated based on the frequency Freq and one or more harmonics of the frequency Freq.

For example, the in-phase signal $D_I$(n) may comprise a product of the error signal e(n) and a summation of a plurality of cosine signals, wherein the cosine signals are respectively generated according to the frequency Freq and the one or more harmonics of the frequency Freq. Similarly, the quadrature-phase signal $D_Q$(n) comprises a product of the error signal e(n) and a summation of a plurality of sine signals, wherein the sine signals are respectively generated according to the frequency Freq and the one or more harmonics of the frequency Freq.

Therefore, according to an embodiment of the invention, the RFI estimation device may further comprise an in-phase and quadrature-phase signal generating circuit configured to generate the in-phase signal $D_I(n)$ and the quadrature-phase signal $D_Q(n)$.

Figure 4:
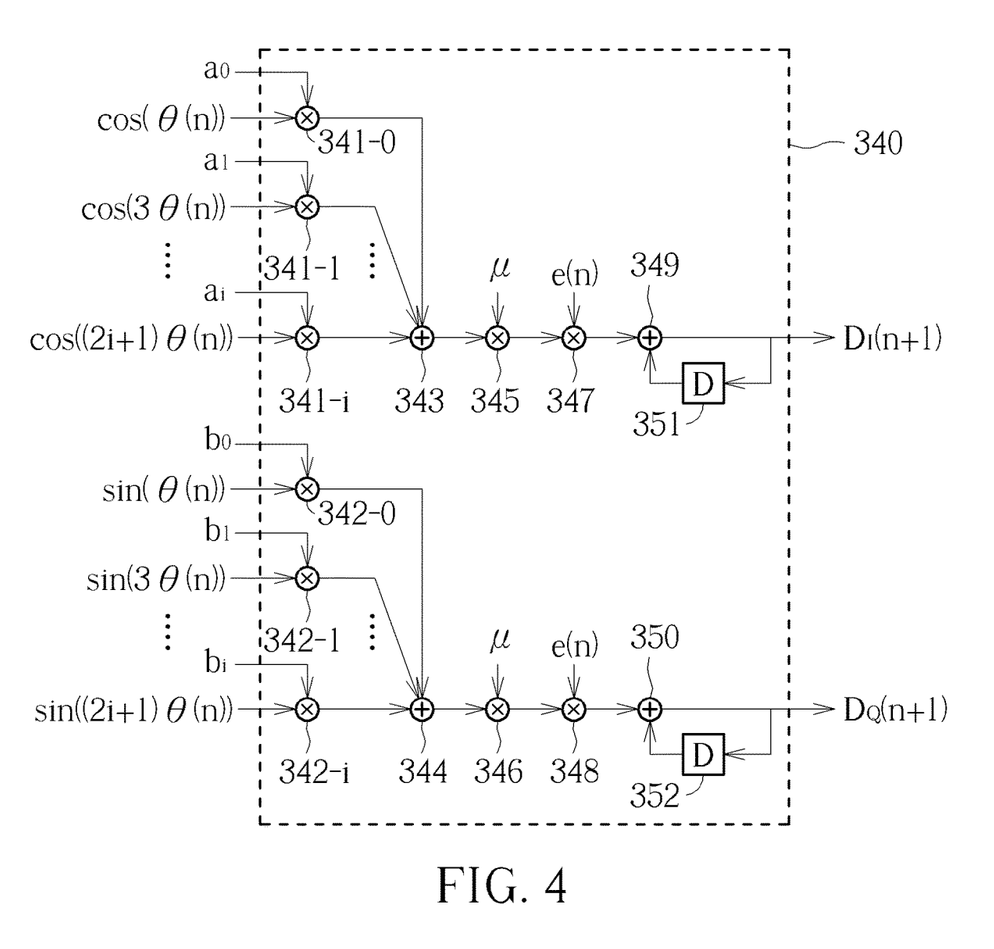
FIG. 4 is an exemplary block diagram of another portion of the RFI estimation device according to an embodiment of the invention.

FIG. 4 is an exemplary block diagram of another portion of the RFI estimation device according to an embodiment of the invention. In FIG. 4, the structure of the in-phase and quadrature-phase signal generating circuit 340 is shown. Operations of the in-phase and quadrature-phase signal generating circuit 340 may be illustrated in brief through the following equations (4) and (5):

$$D_I(n+1) = D_I(n) + \mu * e(n) * \sum_{i=0}^{i=M-1} a_i \cos((2i+1)\theta(n)) \quad \text{Eq. (4)}$$

$$D_Q(n+1) = D_Q(n) + \mu * e(n) * \sum_{i=0}^{i=M-1} b_i \sin((2i+1)\theta(n)) \quad \text{Eq. (5)}$$

where $a_i$ is the weighting corresponding to the cosine signal $\cos((2i+1)\theta(n))$, $b_i$ is the weighting corresponding to the sine signal $\sin((2i+1)\theta(n))$, n is the time index, $D_I(n)$ and $D_Q(n)$ are respectively the in-phase signal and the quadrature-phase signal at the time n, $D_I(n+1)$ and $D_Q(n+1)$ are respectively the in-phase signal and the quadrature-phase signal at the time (n+1), $\mu$ is the weighting of the error signal e(n), and where when i=0, $a_0$=1 and $b_0$=1, and when i>0, $0 \leq |a_i| \leq 1$ and $0 \leq |b_i| \leq 1$, where for the case when i>0, i= 1, ..., (M−1), and M is a positive integer.

Figure 5:
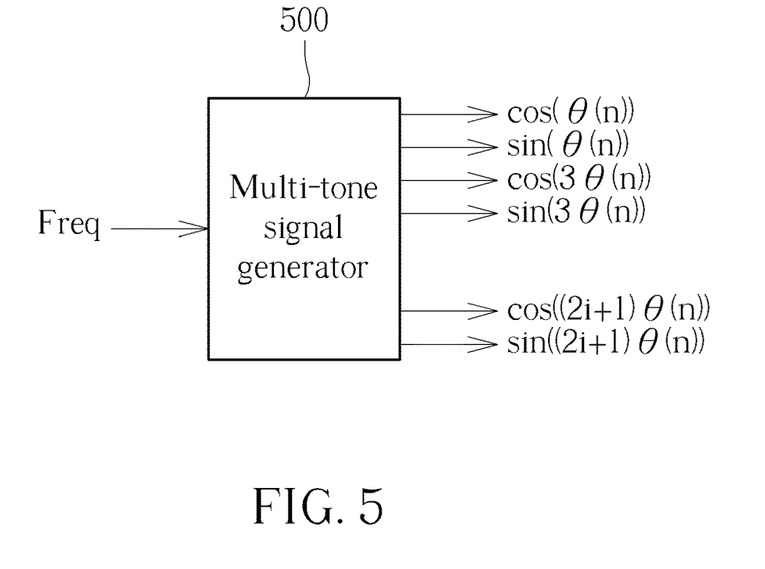
FIG. 5 is an exemplary block diagram of a multi-tone signal generator according to an embodiment of the invention.

To be more specific, the in-phase and quadrature-phase signal generating circuit 340 may comprise a plurality of multipliers 341-0~341-$i$ and 342-0~342-$i$, where i>0. The multipliers 341-0~341-$i$ are configured to respectively multiply the cosine signals $\cos(\theta(n))$ and $\cos((2i+1)\theta(n))$ by the corresponding weightings $a_0$~$a_i$ to obtain the weighted cosine signals. The multipliers 342-0~342-$i$ are configured to respectively multiply the sine signals $\sin(\theta(n))$ and $\sin((2i+1)\theta(n))$ by the corresponding weightings $b_0$~$b_1$ to obtain the weighted sine signals. The cosine signals $\cos(\theta(n))$ and $\cos((2i+1)\theta(n))$ and the sine signals $\sin(\theta(n))$ and $\sin((2i+1)\theta(n))$ may be generated by the multi-tone signal generator 500 shown in FIG. 5 based on the frequency Freq and the time index n.

In addition, the in-phase and quadrature-phase signal generating circuit 340 may further comprise the combiners 343, 344, 349 and 350, the multipliers 345, 346, 347 and 348 and the delay circuits 351 and 352. The combiner 343 is configured to sum up the weighted cosine signals to obtain a first summation and the combiner 344 is configured to sum up the weighted sine signals to obtain a second summation. The multipliers 345 and 347 are configured to multiply the first summation by the error signal e(n) and its weighting $\mu$ to obtain a first result. The multipliers 346 and 348 are configured to multiply the second summation by the error signal e(n) and its weighting $\mu$ to obtain a second result. The in-phase signal $D_I(n+1)$ and the quadrature-phase signal $D_Q(n+1)$ are respectively delayed by the delay circuits 351 and 352 and are fed back to the combiners 349 and 350. The combiners 349 and 350 are respectively configured to combine the first result with the delayed in-phase signal, that is, $D_I(n)$, and combine the second result with the delayed quadrature-phase signal, that is, $D_Q(n)$, to obtain the in-phase signal $D_I(n+1)$ and the quadrature-phase signal $D_Q(n+1)$.

According to an embodiment of the invention, as shown in Eq. (4) and Eq. (5), the one or more harmonics for generating the in-phase signal $D_I(n)/D_I(n+1)$ and the quadrature-phase signal $D_Q(n)/D_Q(n+1)$ are one or more odd harmonics of the frequency Freq. In addition, according to an embodiment of the invention, the weightings $a_0$ and $b_0$ corresponding to the sine signal $\sin(\theta(n))$ and the cosine signal $\cos(\theta(n))$ generated based on the frequency Freq (that is, the condition when i=0 in Eq. (4) and Eq. (5)) will be set to 1, and the weightings $a_i$ and $b_i$ corresponding to the sine signals $\sin((2i+1)\theta(n))$ and the cosine signals $\cos((2i+1)\theta(n))$ generated based on one or more odd harmonics of the frequency Freq (that is, the condition when i>0 in Eq. (4) and Eq. (5)) will be set as $0 \leq |a_i| \leq 1$ and $0 \leq |b_i| \leq 1$. Therefore, an absolute value of the weightings $a_0$ and $b_0$ corresponding to the sine signal $\sin(\theta(n))$ and the cosine signal $\cos(\theta(n))$ generated based on the frequency Freq is greater than or equal to an absolute value of the weightings $a_i$ and $b_i$ corresponding to the sine signals $\sin((2i+1)\theta(n))$ and the cosine signals $\cos((2i+1)\theta(n))$ generated based on the one or more harmonics of the frequency Freq.

The reason of setting the weightings $a_i$ and $b_i$ in the manner as illustrated above is because of that, as the example shown in FIG. 2, the energy of the odd harmonics of the RF inference is usually smaller than that of the main frequency. In the embodiments of the invention, the weightings $a_i$ and $b_i$ and the weighting $\mu$ may be set to adequate values based on some experimental results for the RFI eliminator circuit 110 being able to effectively eliminate the energy of the main frequency component of the RF interference and its harmonics.

Figure 6:
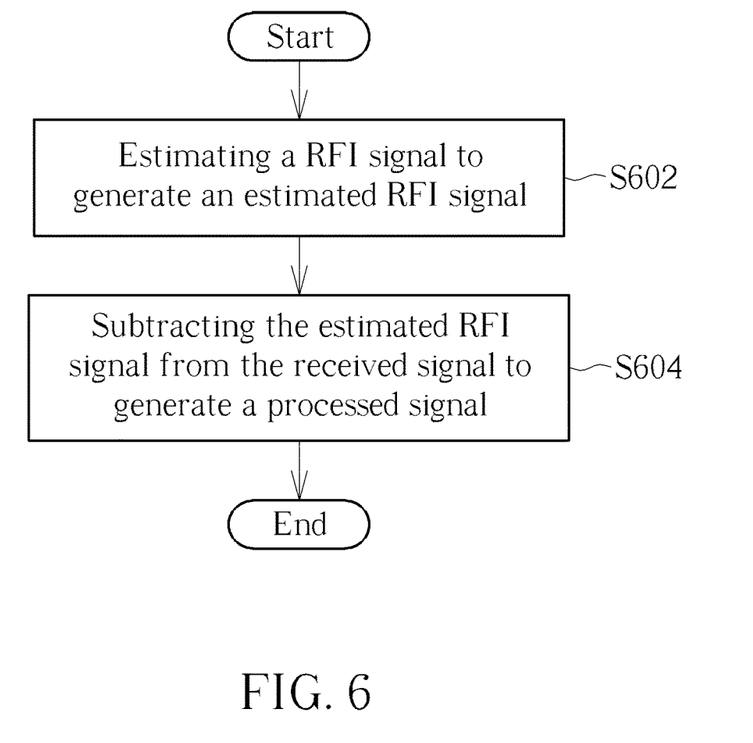
FIG. 6 is a flow chart of signal processing method according to an embodiment of the invention.

FIG. 6 is a flow chart of a signal processing method according to an embodiment of the invention. The signal processing method may be performed by a signal processing device in a communication device for processing a received signal. The signal processing method may comprise the following steps:

S602: estimating a RFI signal to generate an estimated RFI signal RFI_est(n).

S604: subtracting the estimated RFI signal RFI_est(n) from the received signal R(n) to generate a processed signal R'(n).

Figure 7:
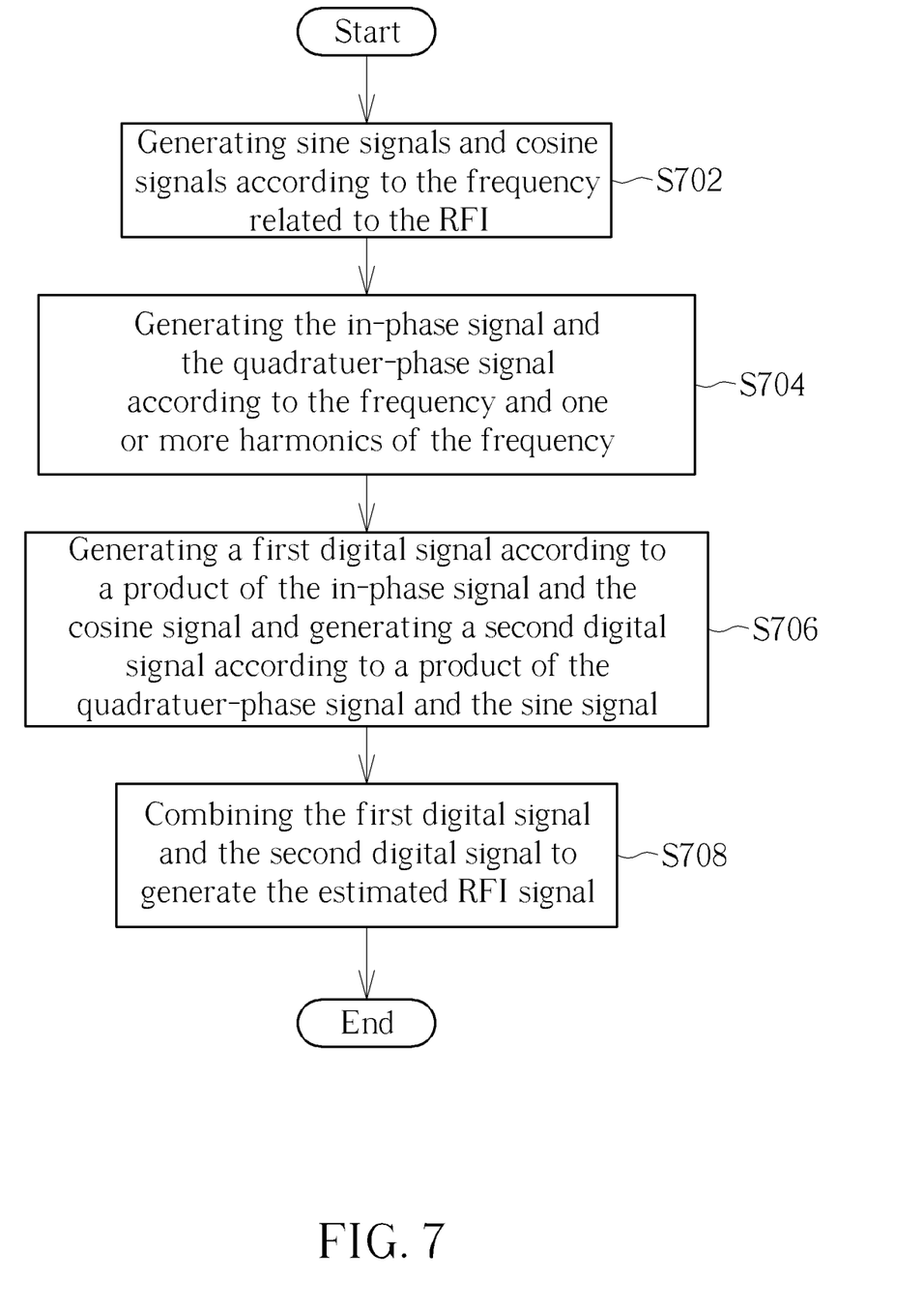
FIG. 7 is another flow chart of a signal processing method according to an embodiment of the invention.

FIG. 7 is another flow chart of a signal processing method according to an embodiment of the invention. In FIG. 7, the details of step S602 are shown. According to an embodiment of the invention, step S602 may further comprise the following steps:

S702: generating sine signals $\sin(\theta(n))$ and cosine signals $\cos(\theta(n))$ according to the frequency Freq related to the RFI.

S704: generating the in-phase signal $D_I(n)$ and the quadrature-phase signal $D_Q(n)$ according to the frequency Freq and one or more harmonics of the frequency Freq.

S706: generating the digital signal D1(*n*) according to a product of the in-phase signal $D_I(n)$ and the cosine signal $\cos(\theta(n))$ and generating the digital signal D2(*n*) according to a product of the quadratuer-phase signal $D_Q(n)$ and the sine signal $\sin(\theta(n))$.

S708: combining the digital signals D1(*n*) and D2(*n*) to generate the estimated RFI signal RFI_est(n).

As discussed above, when the interference in a communication system is too large to cause the problem of large voltage deviation of the received signal, the amount and the direction of error estimated by the receiver may be both wrong. At this time, if the receiver cannot eliminate the influence of the interference from the received signal, the communication performance at the receive size may severely degrade. The proposed signal processing method and associated signal processing device and the RFI estimation device are designed to solve these problems. In the proposed signal processing method and associated signal processing device and the RFI estimation device, the RFI components can be effectively eliminated at the receiver side by simulating the RFI signal according to the main frequency of the RFI signal and its harmonics. In this manner, the signal error at the receiver side can effectively converge. In addition, the proposed signal processing method and associated signal processing device and the RFI estimation device are also helpful for the parameters utilized by the interference eliminating circuit or device to be smoothly adjusted to the optimized values which can minimize the symbol error during the adaptive adjusting or training procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Radio Frequency Interference (RFI) estimation device for generating an estimated RFI signal, comprising:
   a combiner, configured to combine a first digital signal and a second digital signal to generate the estimated RFI signal;
   a first multiplier, configured to generate the first digital signal according to an in-phase signal and a first cosine signal; and
   a second multiplier, configured to generate the second digital signal according to a quadrature-phase signal and a first sine signal,
   wherein the first cosine signal and the first sine signal are generated based on a frequency and the in-phase signal and the quadrature-phase signal are generated based on the frequency and one or more harmonics of the frequency.

2. The RFI estimation device of claim 1, wherein the frequency is an estimated value of a frequency related to a radio frequency interference.

3. The RFI estimation device of claim 1, wherein the one or more harmonics of the frequency comprises one or more odd harmonics of the frequency.

4. The RFI estimation device of claim 1, wherein the in-phase signal comprises a product of an error signal and a summation of a plurality of second cosine signals, the second cosine signals are respectively generated according to the frequency and the one or more harmonics of the frequency, and wherein the error signal is a difference between a voltage value of a symbol and a determined value of the symbol.

5. The RFI estimation device of claim 1, wherein the quadrature-phase signal comprises a product of an error signal and a summation of a plurality of second sine signals, the second sine signals are respectively generated according to the frequency and the one or more harmonics of the frequency, and wherein the error signal is a difference between a voltage value of a symbol and a determined value of the symbol.

6. A signal processing device, applicable for a communication device and configured to process a received signal, comprising:
   a Radio Frequency Interference (RFI) eliminator circuit, comprising:
      a RFI estimation device, configured to generate an estimated RFI signal; and
      a first combiner, configured to combine the estimated RFI signal and the received signal to generate a processed signal,
   wherein the RFI estimation device comprises:
      a second combiner, configured to combine a first digital signal and a second digital signal to generate the estimated RFI signal;
      a first multiplier, configured to generate the first digital signal according to an in-phase signal and a first cosine signal; and
      a second multiplier, configured to generate the second digital signal according to a quadrature-phase signal and a first sine signal,
   wherein the first cosine signal and the first sine signal are generated based on a frequency and the in-phase signal and the quadrature-phase signal are generated based on the frequency and one or more harmonics of the frequency.

7. The signal processing device of claim 6, wherein the frequency is an estimated value of a frequency related to a radio frequency interference.

8. The signal processing device of claim 6, wherein the one or more harmonics of the frequency comprises one or more odd harmonics of the frequency.

9. The signal processing device of claim 6, further comprising:
   a slicer, configured to determine a value of a symbol according to a voltage value; and
   a third combiner, configured to combine the voltage value and the determined value of the symbol to generate an error signal.

10. The signal processing device of claim 9, wherein the in-phase signal comprises a product of the error signal and a summation of a plurality of second cosine signals, the second cosine signals are respectively generated according to the frequency and the one or more harmonics of the frequency.

11. The signal processing device of claim 9, wherein the quadrature-phase signal comprises a product of the error signal and a summation of a plurality of second sine signals, the second sine signals are respectively generated according to the frequency and the one or more harmonics of the frequency.

12. A signal processing method for processing a received signal, suitable for a communication device, the signal processing method comprising:
   estimating a Radio Frequency Interference (RFI) signal to generate an estimated RFI signal; and
   subtracting the estimated RFI signal from the received signal to generate a processed signal,
   wherein the step of estimating the RFI signal to generate the estimated RFI signal further comprises:
   generating a first sine signal and a first cosine signal according to a frequency;
   generating an in-phase signal according to the frequency and one or more harmonics of the frequency;
   generating a quadrature-phase signal according to the frequency and the one or more harmonics of the frequency;
   generating a first digital signal according to a product of the in-phase signal and the first cosine signal;

generating a second digital signal according to a product of the quadrature-phase signal and the first sine signal; and combining the first digital signal and the second digital signal to generate the estimated RFI signal.

13. The signal processing method of claim 12, wherein the frequency is an estimated value of a frequency related to a radio frequency interference.

14. The signal processing method of claim 12, wherein the one or more harmonics of the frequency comprises one or more odd harmonics of the frequency.

15. The signal processing method of claim 12, further comprising:

determining a value of a symbol according to a voltage value of the processed signal; and generating an error signal according to a difference between the voltage value and the determined value of the symbol.

16. The signal processing method of claim 15, wherein the step of generating the in-phase signal according to the frequency and the one or more harmonics of the frequency further comprises:

generating a plurality of second cosine signals according to the frequency and one or more harmonic of the frequency; and generating the in-phase signal according to a product of the error signal and a summation of the second cosine signals.

17. The signal processing method of claim 15, wherein the step of generating the quadrature-phase signal according to the frequency and the one or more harmonics of the frequency further comprises:

generating a plurality of second sine signals according to the frequency and the one or more harmonic of the frequency; and generating the quadrature-phase signal according to a product of the error signal and a summation of the second sine signals.

18. The signal processing method of claim 16, wherein the step of generating the in-phase signal according to the product of the error signal and the summation of the second cosine signals further comprises:

respectively multiplying the second cosine signals by a weighting to obtain a plurality of weighted second cosine signals;

calculating a summation of the weighted second cosine signals; and generating the in-phase signal according to a product of the error signal and the summation of the weighted second cosine signals, wherein an absolute value of the weighting corresponding to the second cosine signal generated based on the frequency is greater than or equal to an absolute value of the weighting (s) corresponding to the second cosine signal(s) generated based on the one or more harmonics of the frequency.

19. The signal processing method of claim 17, wherein the step of generating the quadrature-phase signal according to the product of the error signal and the summation of the second sine signals further comprises:

respectively multiplying the second sine signals by a weighting to obtain a plurality of weighted second sine signals;

calculating a summation of the weighted second sine signals; and generating the quadrature-phase signal according to a product of the error signal and the summation of the weighted second sine signals, wherein an absolute value of the weighting corresponding to the second sine signal generated based on the frequency is greater than or equal to an absolute value of the weighting (s) corresponding to the second sine signal(s) generated based on the one or more harmonics of the frequency.

\* \* \* \* \*